(12) United States Patent
Garg et al.

(10) Patent No.: US 12,198,699 B2
(45) Date of Patent: Jan. 14, 2025

(54) SYSTEM AND METHOD FOR DISPLAYING RADIO COMMUNICATION TRANSCRIPTION

(71) Applicant: HONEYWELL INTERNATIONAL INC., Charlotte, NC (US)

(72) Inventors: Chaya Garg, Plymouth, MN (US); Vasantha Paulraj, Madurai (IN); Robert De Mers, Plymouth, MN (US); Roger Burgin, Phoenix, AZ (US); Jitender Kumar Agarwal, Bangalore (IN); Mahesh Kumar Sampath, Madurai (IN); Mohan M. Thippeswamy, Bangalore (IN); Naveen Venkatesh Prasad Nama, Bangalore (IN); Rahul Pradhan, Bangalore (IN); Nitish Sharma, Bangalore (IN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 262 days.

(21) Appl. No.: 17/805,620

(22) Filed: Jun. 6, 2022

(65) Prior Publication Data
US 2023/0005483 A1 Jan. 5, 2023

(30) Foreign Application Priority Data

Jul. 2, 2021 (IN) .............................. 202111029779

(51) Int. Cl.
*G10L 15/26* (2006.01)
*G08G 5/00* (2006.01)

(52) U.S. Cl.
CPC ............ *G10L 15/26* (2013.01); *G08G 5/0013* (2013.01)

(58) Field of Classification Search
USPC ................ 704/235, 246, 247, 251, 252, 275
See application file for complete search history.

(56) References Cited

U.S. PATENT DOCUMENTS

| | | | |
|---|---|---|---|
| 7,809,405 B1 | 10/2010 | Rand et al. | |
| 8,280,741 B2 * | 10/2012 | Colin | ................... G08G 5/0013 704/275 |
| 9,230,549 B1 | 1/2016 | Popik et al. | |
| 9,466,290 B2 | 10/2016 | Joyce | |
| 9,547,929 B1 | 1/2017 | Whitlow et al. | |
| 9,665,645 B2 | 5/2017 | Hawley | |
| 9,786,276 B2 | 10/2017 | Meruva et al. | |

(Continued)

FOREIGN PATENT DOCUMENTS

CN 206596077 U 10/2017

*Primary Examiner* — Leonard Saint-Cyr
(74) *Attorney, Agent, or Firm* — Lorenz & Kopf LLP (57) ABSTRACT

Methods and systems are provided for displaying transcriptions of radio communication transcription for an aircraft. The method comprises capturing audio signals of radio communication traffic to and from the aircraft. The captured audio signals are preprocessed to divide the signals into independent spoken utterances. Each spoken utterance is transcribed using a speech recognition decoder that utilizes an air traffic control (ATC) speech recognition model and classification data is extracted from the transcription of each spoken utterance. The transcription of each spoken utterance is logged with reference to the classification data and a textual display of the transcription is provided to a crew member of the aircraft.

14 Claims, 9 Drawing Sheets

(56) References Cited

U.S. PATENT DOCUMENTS

| | | |
|---|---|---|
| 10,089,976 B2 | 10/2018 | Oh et al. |
| 10,157,617 B2 | 12/2018 | Shamasundar |
| 10,198,246 B2 | 2/2019 | Paulraj et al. |
| 10,535,351 B2 | 1/2020 | Gaston et al. |
| 2007/0061141 A1 | 3/2007 | Johnson |
| 2011/0125503 A1* | 5/2011 | Dong ................. G10L 21/0208 704/E15.001 |
| 2015/0228273 A1* | 8/2015 | Serban .................... G10L 15/02 704/254 |
| 2016/0063999 A1 | 3/2016 | Gaston et al. |
| 2016/0372117 A1* | 12/2016 | Klose ....................... G10L 17/00 |
| 2018/0109846 A1 | 4/2018 | Jordan et al. |
| 2018/0174588 A1* | 6/2018 | Agarwal ................ G10L 15/30 |
| 2020/0322040 A1 | 10/2020 | Middlestead et al. |
| 2020/0372796 A1 | 11/2020 | Gajapala |

\* cited by examiner

SYSTEM AND METHOD FOR DISPLAYING RADIO COMMUNICATION TRANSCRIPTION

CROSS-REFERENCE TO RELATED APPLICATION(S)

This application claims priority from Indian Provisional Patent Application No. 202111029779, titled "SYSTEM AND METHOD FOR DISPLAYING RADIO COMMUNICATION TRANSCRIPTION" that was filed Jul. 2, 2021.

TECHNICAL FIELD

The present invention generally relates to aircraft communications, and more particularly relates to displaying transcriptions of radio communication transcription for an aircraft.

BACKGROUND

In radio transcription systems used by aircraft, voice communications received from an external source as well as initiated by the crew on the aircraft are susceptible to misinterpretation due to noisy environment, noisy medium of communication, regional differences in vocabulary usage, different English language accents, non-standard phraseology and a high speaking rate. Hence, the availability of the text transcription of voice communication is deemed extremely useful by the crew in the aircraft.

The radio communication channels are not of peer-to-peer communications between aircraft pilots and an air traffic controller (ATC), but instead they are a broadcast transmission. All ATC communications to and from the aircraft and other air traffic tuned to radio frequency are transmitted on the same radio channel. This leads to several issues including auditory overload, call sign confusion and misinterpretation of communicated messages. To address these issues there is a need for mechanisms to alert pilot with a callsign and message intended for the aircraft from ATC. Often a single radio communication is packed with multiple and complex instructions for pilot the including clearances, requests, and commands from an Air Traffic Control Officer (ATCO) which are of critical and important for the pilot to interpret accurately. Hence, there is a need for an efficient, usable, and understandable pilot interface for transcribed radio communications.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

A method is provided for displaying transcriptions of radio communication transcription for an aircraft. The method comprises: capturing audio signals of radio communication traffic to and from the aircraft; preprocessing the captured audio signals to divide the signals into independent spoken utterances; transcribing each spoken utterance using a speech recognition decoder that utilizes an air traffic control (ATC) speech recognition model; extracting classification data from the transcription of each spoken utterance; logging the transcription of each spoken utterance with reference to the classification data; and providing a textual display of the transcription of each spoken utterance to a crew member of the aircraft.

An apparatus is provided for displaying transcriptions of radio communication transcription for an aircraft. The apparatus comprises: a communications receiver that captures audio signals of radio communication traffic to and from the aircraft; a preprocessor that divides the captured audio signals into independent spoken utterances; a speech recognition decoder that transcribes each spoken utterance using an air traffic control (ATC) speech recognition model; a postprocess that extracts classification data from the transcription of each spoken utterance; a log manager that logs the transcription of each spoken utterance with reference to the classification data; and a textual display that displays the transcription of each spoken utterance to a crew member of the aircraft.

Furthermore, other desirable features and characteristics of the method and system will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

A method for displaying transcriptions of radio communication transcription for an aircraft has been developed. The method comprises capturing audio signals of radio communication traffic to and from the aircraft; preprocessing the captured audio signals to divide the signals into independent spoken utterances; transcribing each spoken utterance using a speech recognition decoder that utilizes an air traffic control (ATC) speech recognition model; extracting classification data from the transcription of each spoken utterance; logging the transcription of each spoken utterance with reference to the classification data; and providing a textual display of the transcription of each spoken utterance to a crewmember of the aircraft. The embodiments of the method and systems described herein provide advantages which help the pilot efficiently reference voice communication information both in audio and text form which ultimately reduces workload, improves the user experience, and reduces errors due to misinterpretation of voice communication.

As used herein, charts may be any aviation chart or aeronautical chart provided as an informational aid to a flight crew for flight planning purposes. Chart data is any data provided by an electronic chart or a data driven chart (DDC). Aircraft generally use electronic charts for providing a flight crew member with information specific to a particular route and/or airport. Electronic charts may include airport maps; intersections and taxiways data; procedures and data associated with approach, arrival, and departure; and any flight constraints associated with a current flight plan. A flight plan is a proposed strategy for an intended flight, includes details associated with the intended flight, and is usually filed with an aviation authority (e.g., Federal Aviation Administration). An intended flight may also be referred to as a "trip" and extends from a departure airport at the beginning point of the trip to a destination airport at the endpoint of the trip. An alert may be any signal or warning indicating potential non-compliance with constraints associated with the current flight plan. The alert may be implemented as a display of text and/or graphical elements, a sound, a light, or other visual or auditory warning signal onboard the aircraft.

Figure 1:
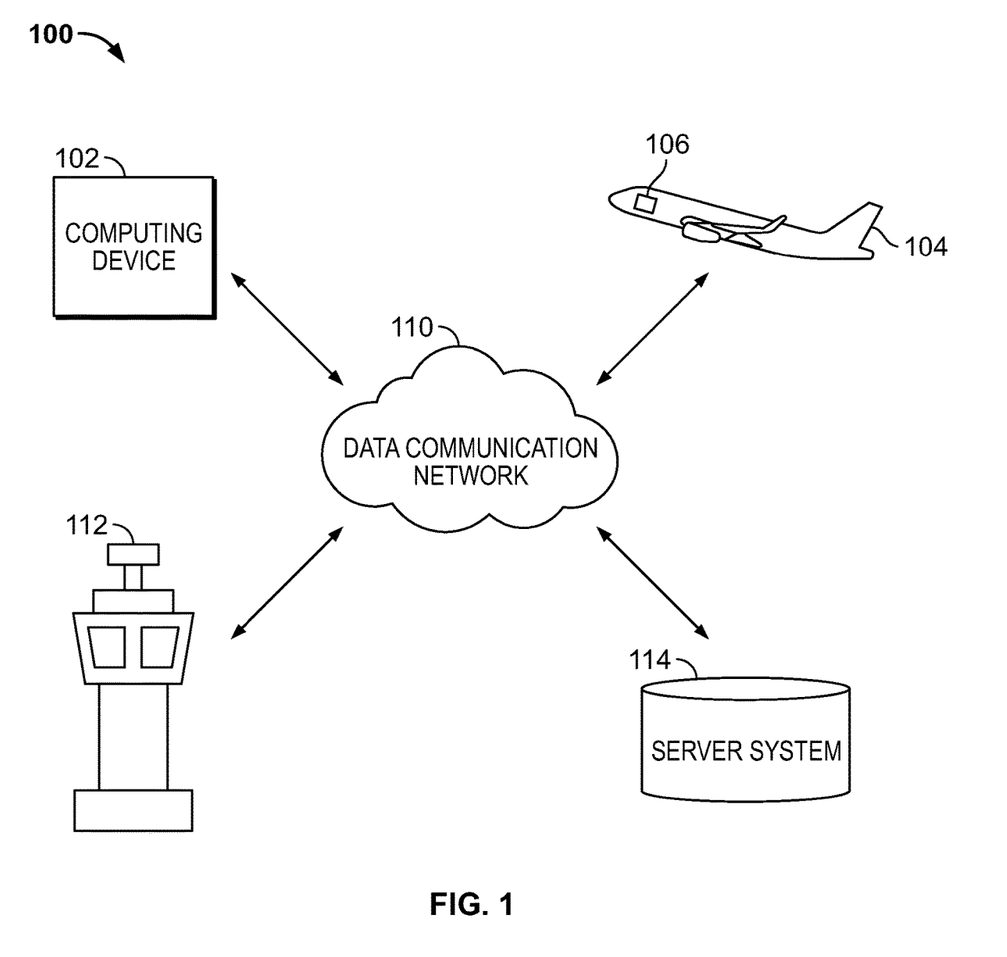
FIG. 1 shows a diagram of a system for providing displaying radio transcription onboard an aircraft in accordance with one embodiment.

Turning now to the figures, FIG. 1 is a diagram of a system 100 for providing displaying radio transcription onboard an aircraft, in accordance with the disclosed embodiments. The system 100 operates with a current flight of the aircraft 104, to continuously monitor flight data and parameters during flight. The system 100 may include, without limitation, a computing device 102 that communicates with one or more avionics systems 106 onboard the aircraft 104, at least one server system 114, and air traffic control (ATC) 112, via a data communication network 110. In practice, certain embodiments of the system 100 may include additional or alternative elements and components, as desired for the particular application.

The computing device 102 may be implemented by any computing device that includes at least one processor, some form of memory hardware, a user interface, and communication hardware. For example, the computing device 102 may be implemented using a personal computing device, such as a tablet computer, a laptop computer, a personal digital assistant (PDA), a smartphone, or the like. In this scenario, the computing device 102 is capable of storing, maintaining, and executing an Electronic Flight Bag (EFB) application configured to determine and present emergency alerts when flight constraints may not be satisfied by the current flight of the aircraft 104. In other embodiments, the computing device 102 may be implemented using a computer system onboard the aircraft 104, which is configured to determine and present such emergency alerts.

The aircraft 104 may be any aviation vehicle for which flight constraints and alerts associated with non-compliance with flight constraints are relevant and applicable during completion of a flight route. The aircraft 104 may be implemented as an airplane, helicopter, spacecraft, hovercraft, or the like. The one or more avionics systems 106 may include a Flight Management System (FMS), crew alerting system (CAS) devices, automatic terminal information system (ATIS) devices, Automatic Dependent Surveillance—Broadcast (ADS-B), Controller Pilot Data Link Communication (CPDLC), navigation devices, weather radar, aircraft traffic data, and the like. Data obtained from the one or more avionics systems 106 may include, without limitation: an approved flight plan, an estimated time of arrival, instructions from air traffic control (ATC), Automatic Terminal Information Service (ATIS) data, flight plan restriction data, onboard equipment failure data, aircraft traffic data, weather data, or the like.

The server system 114 may include any number of application servers, and each server may be implemented using any suitable computer. In some embodiments, the server system 114 includes one or more dedicated computers. In some embodiments, the server system 114 includes one or more computers carrying out other functionality in addition to server operations. The server system 114 may store and provide any type of data used to determine compliance and/or non-compliance with constraints associated with the current flight. Such data may include, without limitation: flight plan data, flight plan constraint data, and other data compatible with the computing device 102.

The computing device 102 is usually located onboard the aircraft 104, and the computing device 102 communicates with the server system 114 and air traffic control 112 via a wireless communication connection. The computing device 102 and the server system 114 are generally disparately located, and the computing device 102 and air traffic control 112 are generally disparately located. The computing device 102 communicates with the server system 114 and air traffic control 112 via the data communication network 110 and/or via communication mechanisms onboard the aircraft 104.

The data communication network 110 may be any digital or other communications network capable of transmitting messages or data between devices, systems, or components. In certain embodiments, the data communication network 110 includes a packet switched network that facilitates packet-based data communication, addressing, and data routing. The packet switched network could be, for example, a wide area network, the Internet, or the like. In various embodiments, the data communication network 110 includes any number of public or private data connections, links or network connections supporting any number of communications protocols. The data communication network 110 may include the Internet, for example, or any other network based upon TCP/IP or other conventional protocols. In various embodiments, the data communication network 110 could also incorporate a wireless and/or wired telephone network, such as a cellular communications network for communicating with mobile phones, personal digital assistants, and/or the like. The data communication network 110 may also incorporate any sort of wireless or wired local and/or personal area networks, such as one or more IEEE 802.3, IEEE 802.16, and/or IEEE 802.11 networks, and/or networks that implement a short range (e.g., Bluetooth)

protocol. For the sake of brevity, conventional techniques related to data transmission, signaling, network control, and other functional aspects of the systems (and the individual operating components of the systems) may not be described in detail herein.

Figure 2:
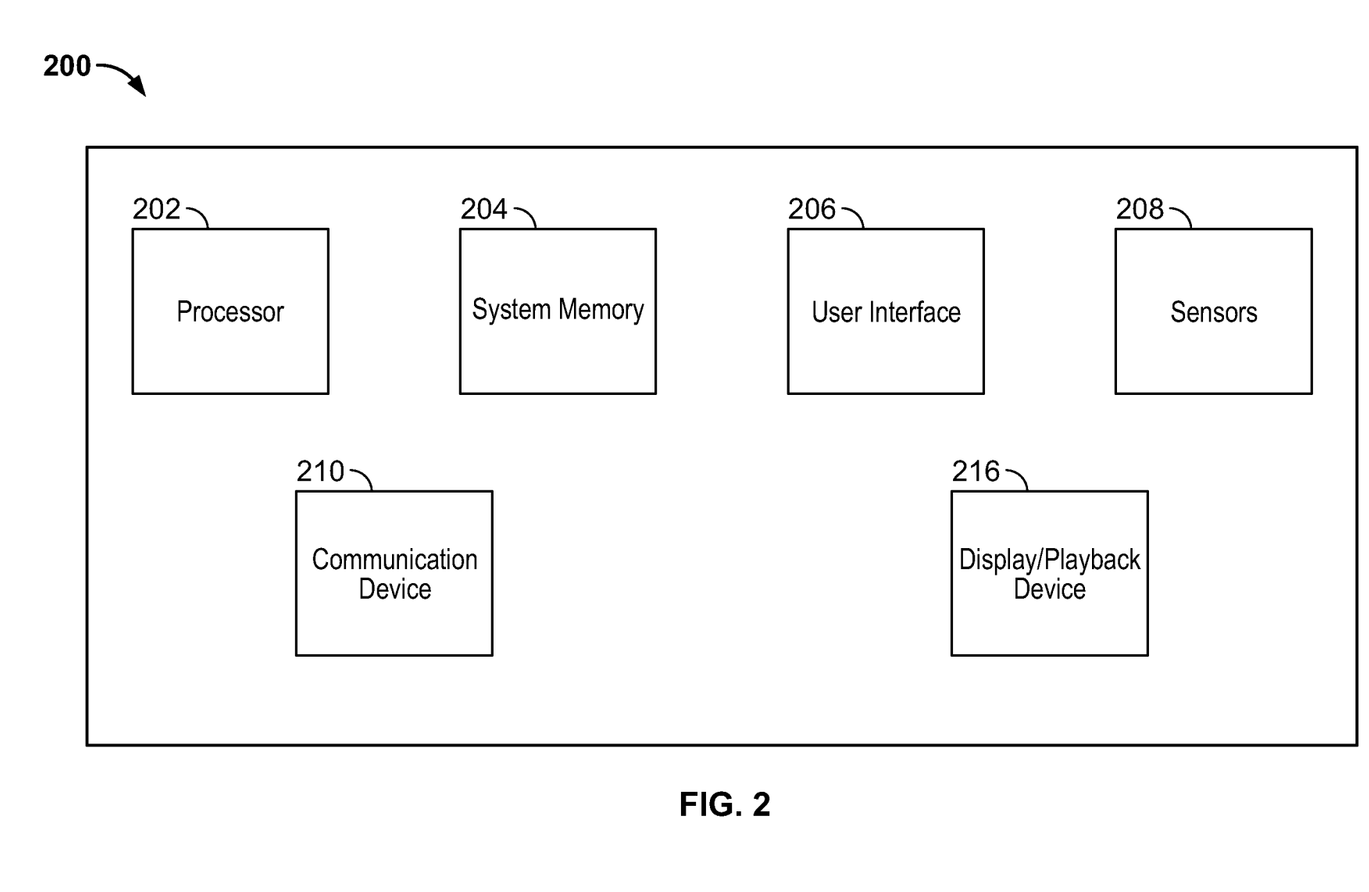
FIG. 2 shows a functional block diagram of a computing device, in accordance with one embodiment.

FIG. 2 is a functional block diagram of a computing device 200, in accordance with the disclosed embodiments. It should be noted that the computing device 200 can be implemented with the computing device 102 depicted in FIG. 1. In this regard, the computing device 200 shows certain elements and components of the computing device 102 in more detail.

The computing device 200 generally includes, without limitation: a processor 202; system memory 204; a user interface 206; a plurality of sensors 208; a communication device 210; and a display and/or playback device 216. These elements and features of the computing device 200 may be operatively associated with one another, coupled to one another, or otherwise configured to cooperate with one another as needed to support the desired functionality. For ease of illustration and clarity, the various physical, electrical, and logical couplings and interconnections for these elements and features are not depicted in FIG. 2. Moreover, it should be appreciated that embodiments of the computing device 200 will include other elements, modules, and features that cooperate to support the desired functionality. For simplicity, FIG. 2 only depicts certain elements that are described in more detail below.

The processor 202 may be implemented or performed with one or more general purpose processors, a content addressable memory, a digital signal processor, an application specific integrated circuit, a field programmable gate array, any suitable programmable logic device, discrete gate or transistor logic, discrete hardware components, or any combination designed to perform the functions described here. In particular, the processor 202 may be realized as one or more microprocessors, controllers, microcontrollers, or state machines. Moreover, the processor 202 may be implemented as a combination of computing devices, e.g., a combination of digital signal processors and microprocessors, a plurality of microprocessors, one or more microprocessors in conjunction with a digital signal processor core, or any other such configuration.

The processor 202 is communicatively coupled to the system memory 204. The system memory 204 is configured to store any obtained or generated data associated with generating alerts to redirect user attention from the computing device 200 to a critical or high-priority flight situation. The system memory 204 may be realized using any number of devices, components, or modules, as appropriate to the embodiment. Moreover, the computing device 200 could include system memory 204 integrated therein and/or a system memory 204 operatively coupled thereto, as appropriate to the particular embodiment. In practice, the system memory 204 could be realized as RAM memory, flash memory, EPROM memory, EEPROM memory, registers, a hard disk, a removable disk, or any other form of storage medium known in the art. In certain embodiments, the system memory 204 includes a hard disk, which may also be used to support functions of the computing device 200. The system memory 204 can be coupled to the processor 202 such that the processor 202 can read information from, and write information to, the system memory 204. In the alternative, the system memory 204 may be integral to the processor 202. As an example, the processor 202 and the system memory 204 may reside in a suitably designed application-specific integrated circuit (ASIC).

The user interface 206 may include or cooperate with various features to allow a user to interact with the computing device 200. Accordingly, the user interface 206 may include various human-to-machine interfaces, e.g., a keypad, keys, a keyboard, buttons, switches, knobs, a touchpad, a joystick, a pointing device, a virtual writing tablet, a touch screen, a microphone, or any device, component, or function that enables the user to select options, input information, or otherwise control the operation of the computing device 200. For example, the user interface 206 could be manipulated by an operator to provide flight data parameters during the operation of electronic flight bag (EFB) applications, as described herein.

In certain embodiments, the user interface 206 may include or cooperate with various features to allow a user to interact with the computing device 200 via graphical elements rendered on a display element (e.g., the display device 216). Accordingly, the user interface 206 may initiate the creation, maintenance, and presentation of a graphical user interface (GUI). In certain embodiments, the display device 216 implements touch-sensitive technology for purposes of interacting with the GUI. Thus, a user can manipulate the GUI by moving a cursor symbol rendered on the display device 216, or by physically interacting with the display device 216 itself for recognition and interpretation, via the user interface 206.

The plurality of sensors 208 is configured to obtain data associated with active use of the computing device 200, and may include, without limitation: touchscreen sensors, accelerometers, gyroscopes, or the like. Some embodiments of the computing device 200 may include one particular type of sensor, and some embodiments may include a combination of different types of sensors. Generally, the plurality of sensors 208 provides data indicating whether the computing device 200 is currently being used. Touchscreen sensors may provide output affirming that the user is currently making physical contact with the touchscreen (e.g., a user interface 206 and/or display device 216 of the computing device 200), indicating active use of the computing device. Accelerometers and/or gyroscopes may provide output affirming that the computing device 200 is in motion, indicating active use of the computing device 200.

The communication device 210 is suitably configured to communicate data between the computing device 200 and one or more remote servers and one or more avionics systems onboard an aircraft. The communication device 210 may transmit and receive communications over a wireless local area network (WLAN), the Internet, a satellite uplink/downlink, a cellular network, a broadband network, a wide area network, or the like. As described in more detail below, data received by the communication device 210 may include, without limitation: avionics systems data and aircraft parameters (e.g., a heading for the aircraft, aircraft speed, altitude, aircraft position, ascent rate, descent rate, a current flight plan, a position of air spaces around a current flight plan, and activity of the air spaces around a current flight plan), and other data compatible with the computing device 200. Data provided by the communication device 210 may include, without limitation, requests for avionics systems data, alerts and associated detail for display via an aircraft onboard display, and the like.

The display/playback device 216 is configured to display various icons, text, and/or graphical elements associated with alerts related to situations requiring user attention, wherein the situations are associated with a device or system that is separate and distinct from the computing device 200. In an exemplary embodiment, the display device 216 and the user interface 206 are communicatively coupled to the processor 202. The processor 202, the user interface 206, and the display/playback device 216 are cooperatively configured to display, render, or otherwise convey one or more graphical representations or images associated with high-priority or critical flight situation alerts on the display/playback device 216, as described in greater detail below. In an exemplary embodiment, the display/playback device 216 is realized as an electronic display configured to graphically display critical flight situation alerts and associated detail, as described herein. In some embodiments, the computing device 200 is an integrated computer system onboard an aircraft, and the display/playback device 216 is located within a cockpit of the aircraft, and is thus implemented as an aircraft display. In other embodiments, the display/playback device 216 is implemented as a display screen of a standalone, personal computing device (e.g., laptop computer, tablet computer). It will be appreciated that although the display/playback device 216 may be implemented using a single display, certain embodiments may use additional displays (i.e., a plurality of displays) to accomplish the functionality of the display/playback device 216 described herein.

Figure 3:
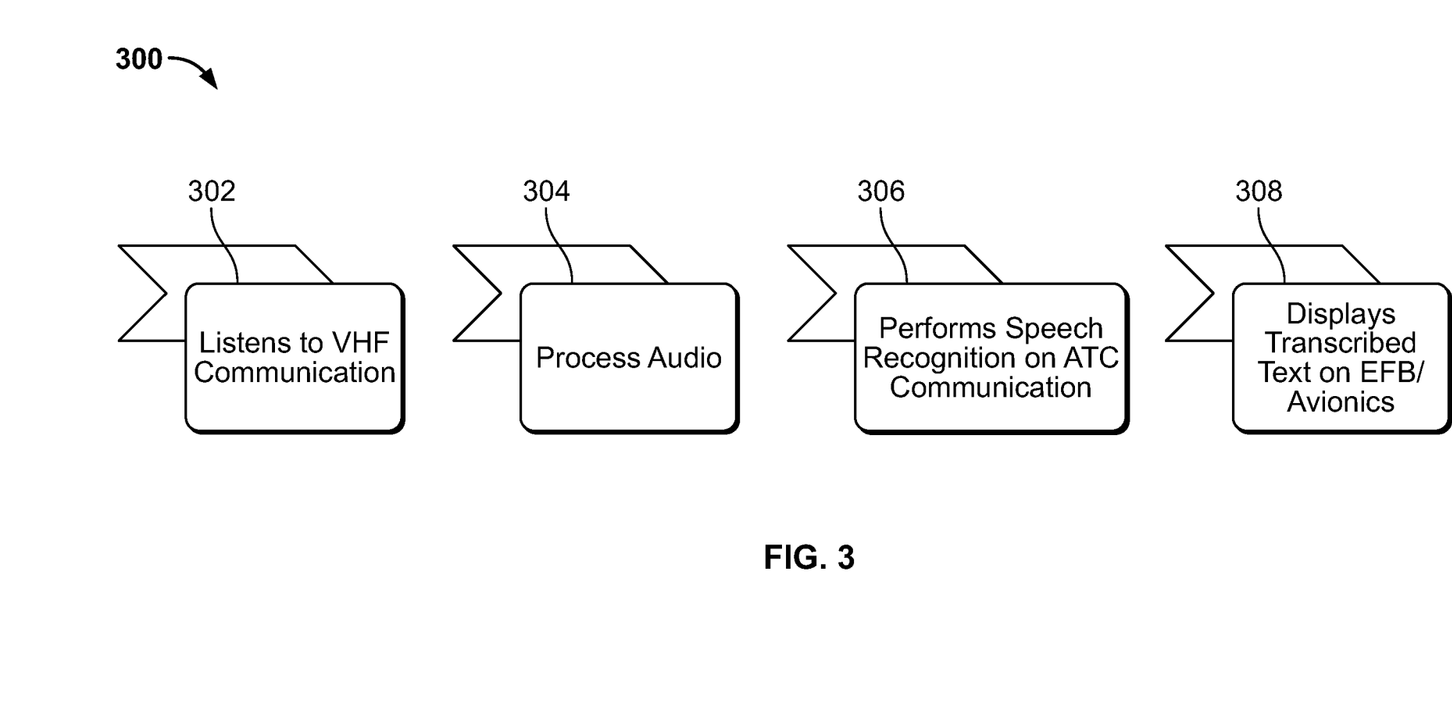
FIG. 3 shows a flow diagram of the method for displaying radio communication transcription in accordance with one embodiment.

Turning now to FIG. 3, a flow diagram 300 is shown of the method for displaying radio communication transcription in accordance with one embodiment. Various embodiments provide method and features to display the ATC voice communication transcription in an efficient way for pilot. The system comprises of speech engine system which transcribes the input radio communication voice audio into post processed text. The system in scope continuously listens to the VHF audio by connecting to the audio panel 302. In real-time continuous audio is processed 304 and converted to text using speech recognition 306. The processed text. is made available to pilot via display application in a comprehensible manner 308.

Figure 4:
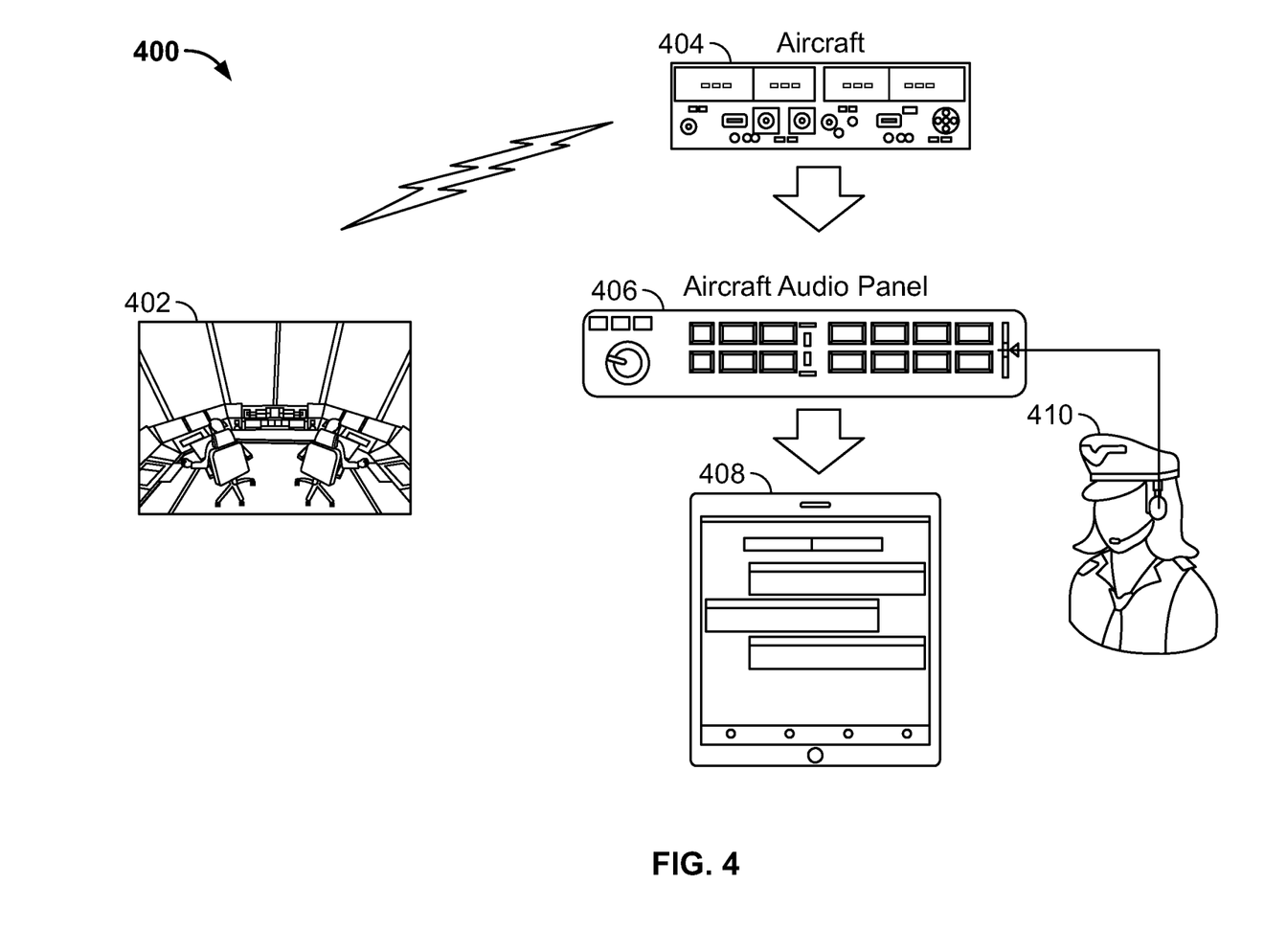
FIG. 4 shows a diagram of the system for displaying radio communication transcription in accordance with one embodiment.

Turning now to FIG. 4, a diagram is shown 400 of the system for displaying and/or playing audio of radio communication transcriptions in accordance with one embodiment described previously in FIG. 3. The system includes the ATC 402 in radio communication with the aircraft's communication system 404 which includes an audio panel 406 and an air traffic control transcription (ATCT) application 408 that are provided to the pilot 410.

Figure 5:
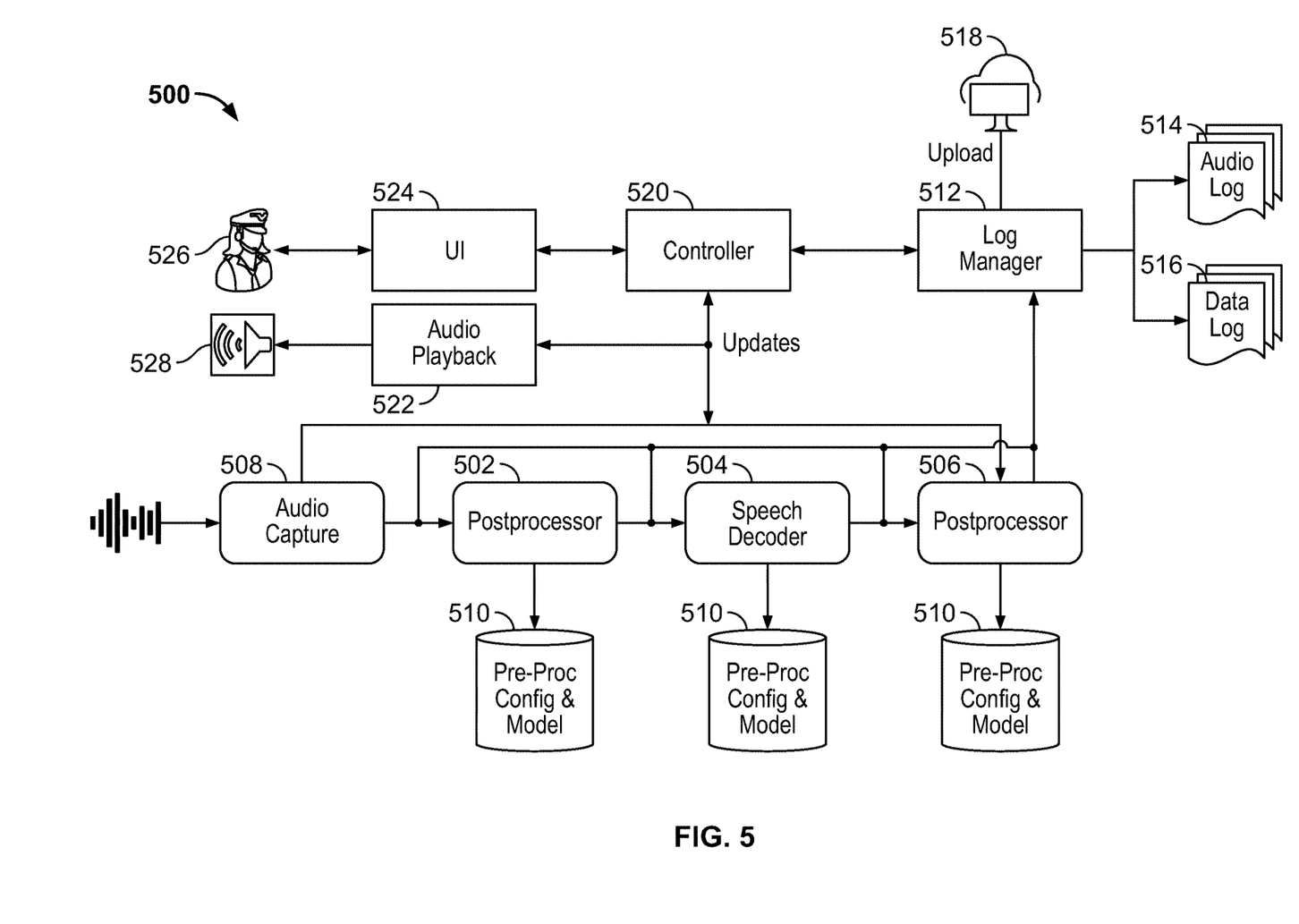
FIG. 5 shows a block diagram of the system for displaying radio communication transcription in accordance with one embodiment.

Turning now to FIG. 5, a block diagram 500 is shown of the system for displaying radio communication transcription in accordance with one embodiment. The system comprises of three primary components: a preprocessor 502; a speech decoder 504; and a postprocessor 506. The preprocessor 502 component performs processing of continuous audio capture 508 containing both speech and silence component and segments them into independent spoken utterance. Each independent spoken utterance corresponds to individual ATC clearance/command/approval or pilot's responseireadback/requests or spoken phrase within the radio communication. The speech decoder component 504 is the automatic speech recognition component which transcribes the input utterance from preprocessor component 506 to text using ATCT speech recognition model 510 comprising of acoustic, lexicon and language model covering the ATC vocabulary and phraseology. Finally, the postprocessor component 506 is the text processor component responsible for extracting the aircraft's consign, and classifying the utterance transcription into either: traffic messages, the aircrafts messages, possible aircraft messages or unrecognized messages.

The classified transcriptions are received by a log manager 512 for the system and stored in either an audio log 514, a data log 516 and uploaded to cloud based storage 518 as needed. The classified transcriptions are also sent to a controller 520 which provides the transcriptions to user interface (UI) 524 with display features for use by an aircrew member 526. The classified utterance transcriptions are sent for audio playback 522 through an audio speaker device 528.

Figure 6:
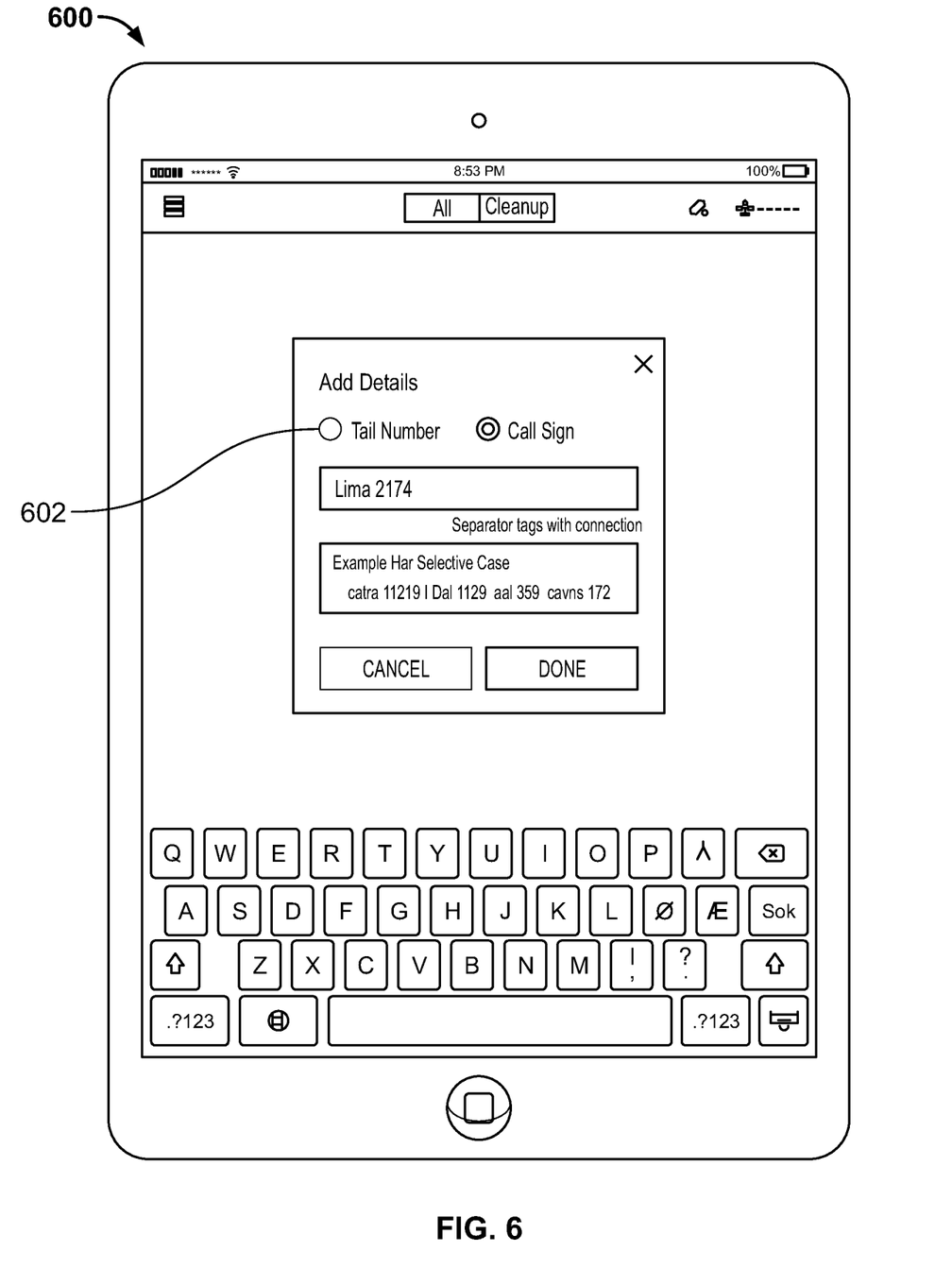
FIG. 6 shows a display screen for entry of an aircraft tail number in accordance with one embodiment.

The UI 524 may include login and usage help/guidance pages that allow the user to select different view modes and configurations. As shown in FIG. 6, the UI includes a display screen 600 for entry of an aircraft tail number 602 in accordance with one embodiment. This feature enables the pilot to enter the tail number and call sign variations of the aircraft. It also provides options to select previously saved entries and tail number/call sign variations.

Figure 7:
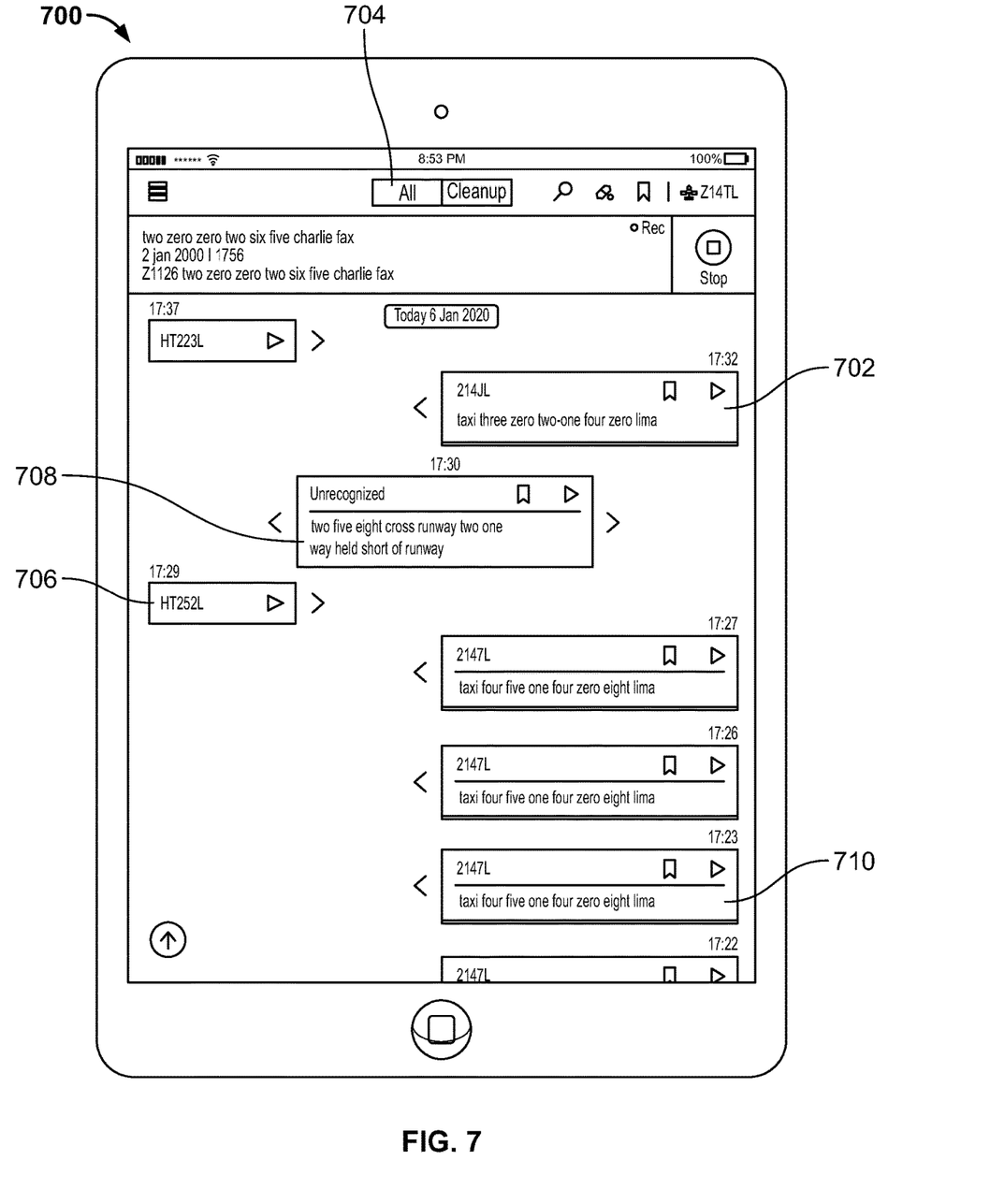
FIG. 7 shows a display screen for transcribed texts of all radio communication traffic in accordance with one embodiment.

The main view of the UI displays such information as a title label, various menus, status icons, transcription view tabs selections, bookmarks, and tail number entries. As shown in FIG. 7, the display screen 700 shows transcribed texts 702 of all radio communication traffic in accordance with one mode of operation. All of the transcribed messages 702 are displayed in a virtual table format and the display provides scroll view option to see older messages as well as a quick access button to go to the latest message. Since, the radio communication channels are broadcast, all ATC communication to and from the aircraft are transmitted on the same radio channel. The system receives all the radio communications and needs for triage the communication for easy access by the pilot. The system uses the entered tail number and call sign variation to perform the real-time traffic classification of the transcribed radio communications.

Figure 8:
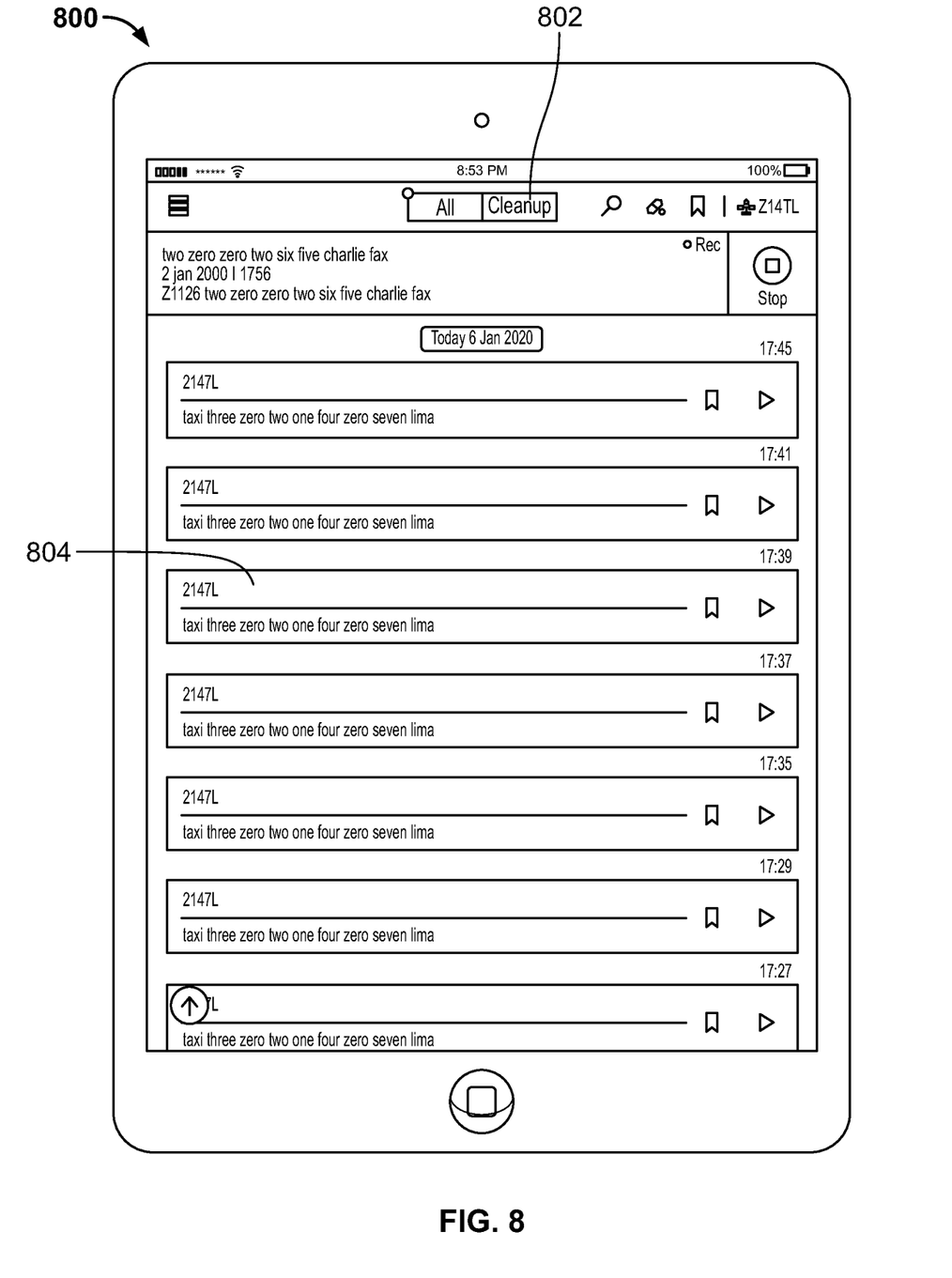
FIG. 8 shows a display screen for transcribed texts of the user's aircraft radio communication traffic in accordance with one embodiment.

The UI display of the proposed app has two tabs to select the transcription display mode. As shown in FIG. 7, the "All" tab 704 is selected to display 700 all of the communication transcription received through the radio channel the view provides virtual table view with three columns. In the embodiment shown, the right most column 706 displays only transcriptions corresponding to messages for the aircraft. The middle column 708 displays the possible aircraft and unrecognized tail number utterances. Some of the transcribed communication utterances, may not contain any call sign related info or may only contain partial aircraft call sign information. Those messages are indicated respectively as an unrecognized tail number or a possible aircraft message. Finally, the left column 710 displays the related transcribed utterances from the aircraft. As shown in FIG. 8, the "Ownship" tab 802 is selected to display 800 only the communication transcription 804 received through the radio channel that are directed to the aircraft. This helps pilot to focus only the message intended for his aircraft.

Figure 9:
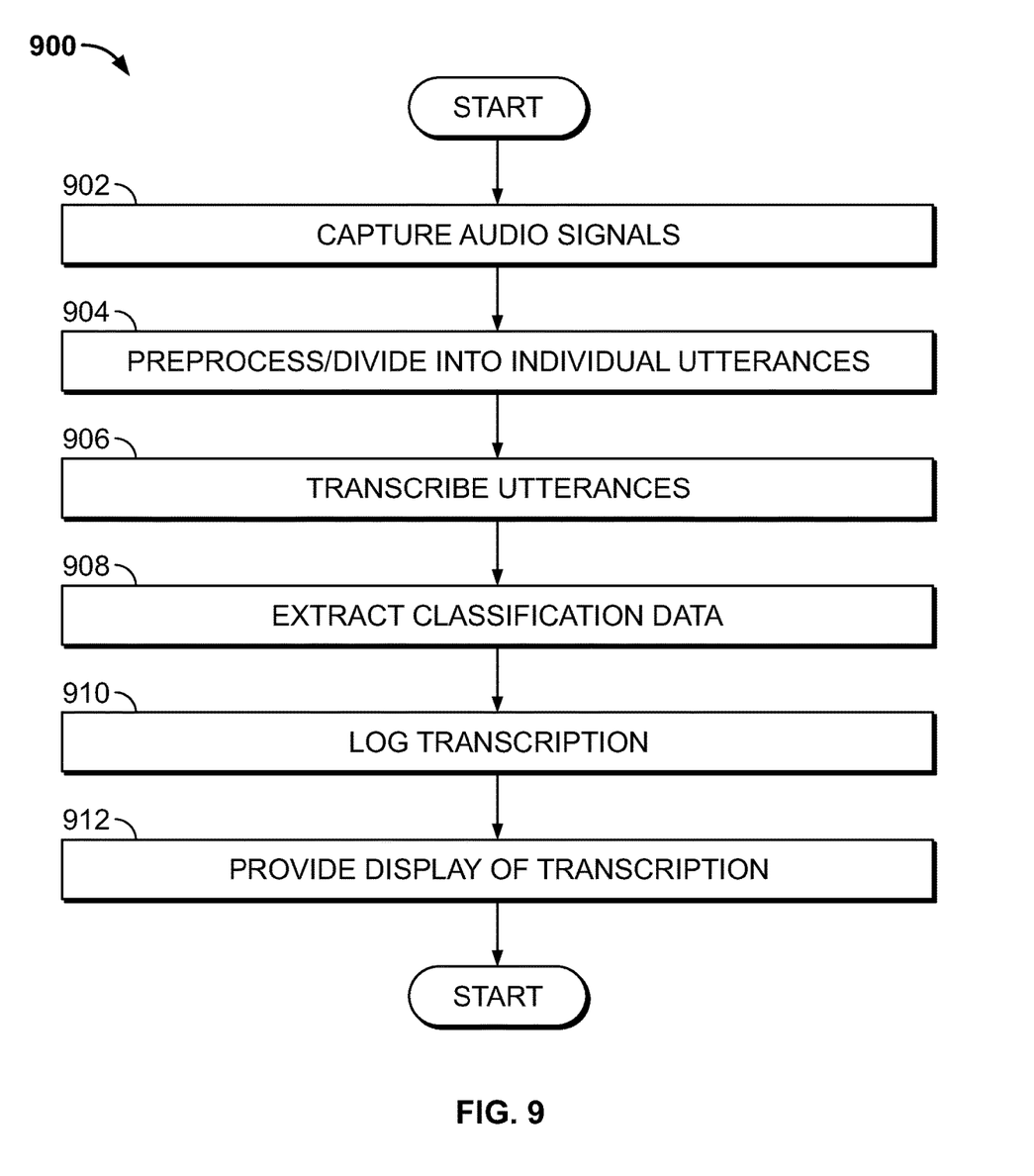
FIG. 9 shows a flowchart of a method for displaying radio communication transcription in accordance with one embodiment.

FIG. 9 shows a flowchart 900 of a method for displaying radio communication transcription in accordance with one embodiment. First, audio signals of radio communication traffic to and from the aircraft are captured 902. The captured audio signals are preprocessed to divide the signals into independent spoken utterances 904. Each spoken utterance is then transcribed using a speech recognition decoder that utilizes an air traffic control (ATC) speech recognition model 906. Next, classification data extracted from the transcription of each spoken utterance 908. The transcription of each spoken utterance is logged with reference to the classification data 910. Finally, a textual display of the transcription of each spoken utterance is provided to a crew member of the aircraft 912.

Other display features may include a transcription message box which displays the transcription text of each independent communication utterance, associated tail number and timestamp. The message box is also enabled with additional UI elements such as: a play button that plays of audio corresponding to the utterance; a bookmark button for bookmarking of the message for later reference; and a swipe arrow for moving the message from one classification column to other. Other UI elements include a most recent message box. The most recent message box gets displayed on the top of the transcription display view with different color. It has all the UI elements as the transcription message box except the swipe UI element. Additionally, it contains button for enabling the pilot to pause or continue the display of the transcriptions. The color of recent message box may be chosen by the pilot. Other UI elements include various status indicators or icons showing connection status, volume, menus, software updates, etc. In some embodiments, a last flight replay feature can be accessed via settings menu. The user can enable last flight replay mode to play and view the list of transcribed messages and audio playback. This is very useful for pilot for any post flight analysis, learning and inferences.

Advantages of the various embodiments may include the use of a transcription view with tabs for either "All" and "Ownship" to display the realtime classified messages relevant to traffic and the aircraft. This allows the pilot flexibility to focus on aircraft communications only or to get more context by using the "All" view. Other advantages include the ability to configure all call sign and tail number variations spoken by pilot and ATC relevant to the aircraft. This allows the triaging of aircraft communications not only using the tail number or call sign but also using known nicknames and phonetic variations used during radio communication. Another advantage is the display of transcriptions with separate column views to display realtime classified messages of: traffic/inflight/broadcast messages; possible or unrecognized tail number; and ownship only messages. This functionality affords the pilot a mechanism to provide feedback by swiping utterances from one column to the other. It also clearly delineates aircraft communications to pilots while making available traffic communications to increase Situational Awareness (SA). Another advantage is the Ability to select and view ow only messages. This provides the pilot the option of an uncluttered view and the ability to focus on relevant aircraft communications.

Other advantages include an abbreviated view of traffic/inflight audio and transcription for any validation. This feature provides immediate access to the audio of interest and requires no search for the audio corresponding to a specific clearance. This allows the pilot to listen to audio of interest a second time without any additional workload. In fact, it is expected to reduce the number of times pilots will ask ATC to repeat a clearance and thereby reduce frequency congestion. Another advantage is a unique transcription message UI element with callsign, timestamp, transcription text, playback, and bookmark. Integrated presentation of transcribed radio communications with related information such as timestamp, tail number, associated audio etc. Also, the ability to bookmark messages for later review and view in separate view/page/overlay. This addresses adjacent use cases. One example is when pilots need to refer to communications when implementing/dialing in values especially for conditional clearances since they need to be implemented after a condition is met such as a certain amount of time has elapsed or a waypoint/flight level has been reached. Another example is when pilots want to refer to the format for an infrequently used clearance. An advantage is the ability to view logs of previous flights with date and tail number reference. This is useful for the need to clarify what exactly was spoken by pilot and/or ATC. The logs also are a required input for real-time or post flight analytics. Also, the ability to playback the transcription and audio of last flight. This is very useful for training pilots and assessing proficiency in understanding and responding to radio communications. Another advantage is the ability to set a timer reminder associated with specific communications/clearances. This feature is especially useful when the pilot must refer to or remember specific instructions. Examples include reporting after reaching a specific waypoint or implementing a heading or speed target after a specified time/condition is met. The timer can be set by the pilot either by double tapping on the message or using the time icon provided in the message element.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

When implemented in software or firmware, various elements of the systems described herein are essentially the code segments or instructions that perform the various tasks. The program or code segments can be stored in a processor-readable medium or transmitted by a computer data signal embodied in a carrier wave over a transmission medium or communication path. The "computer-readable medium", "processor-readable medium", or "machine-readable medium" may include any medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like.

The following description refers to elements or nodes or features being "connected" or "coupled" together. As used herein, unless expressly stated otherwise, "coupled" means that one element/node/feature is directly or indirectly joined to (or directly or indirectly communicates with) another element/node/feature, and not necessarily mechanically. Likewise, unless expressly stated otherwise, "connected" means that one element/node/feature is directly joined to (or directly communicates with) another element/node/feature, and not necessarily mechanically. Thus, additional intervening elements, devices, features, or components may be present in an embodiment of the depicted subject matter.

In addition, certain terminology may also be used in the following description for the purpose of reference only, and thus are not intended to be limiting. For example, terms such as "upper", "lower", "above", and "below" refer to directions in the drawings to which reference is made. Terms such as "front", "back", "rear", "side", "outboard", and "inboard" describe the orientation and/or location of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second", and other such numerical terms referring to structures do not imply a sequence or order unless clearly indicated by the context.

For the sake of brevity, conventional techniques related to signal processing, data transmission, signaling, network control, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

Some of the functional units described in this specification have been referred to as "modules" in order to more particularly emphasize their implementation independence. For example, functionality referred to herein as a module may be implemented wholly, or partially, as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like. Modules may also be implemented in software for execution by various types of processors. An identified module of executable code may, for instance, comprise one or more physical or logical modules of computer instructions that may, for instance, be organized as an object, procedure, or function. Nevertheless, the executables of an identified module need not be physically located together but may comprise disparate instructions stored in different locations that, when joined logically together, comprise the module and achieve the stated purpose for the module. Indeed, a module of executable code may be a single instruction, or many instructions, and may even be distributed over several different code segments, among different programs, and across several memory devices. Similarly, operational data may be embodied in any suitable form and organized within any suitable type of data structure. The operational data may be collected as a single data set or may be distributed over different locations including over different storage devices, and may exist, at least partially, merely as electronic signals on a system or network.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A method for displaying transcriptions of radio communication transcription for an aircraft, comprising:
    capturing audio signals of radio communication traffic to and from the aircraft;
    preprocessing the captured audio signals to divide the signals into independent spoken utterances;
    transcribing each spoken utterance using a speech recognition decoder that utilizes an air traffic control (ATC) speech recognition model;
    extracting classification data from the transcription of each spoken utterance;
    logging the transcription of each spoken utterance with reference to the classification data; and
    providing a textual display of the transcription of each spoken utterance to a crew member of the aircraft,
    wherein:
        the textual display comprises separate sub-displays for: (i) messages for the aircraft, (ii) messages from the aircraft, and (iii) unrecognized messages, and
        the textual display further comprises a swipe arrow for moving messages from one sub-display another.

2. The method of claim 1, where the ATC speech recognition model comprises an acoustic recognition model.

3. The method of claim 1, where the ATC speech recognition model comprises an lexicon recognition model.

4. The method of claim 1, where the ATC speech recognition model comprises an language recognition model.

5. The method of claim 1, where the extracted classification data comprises an aircraft call sign.

6. The method of claim 1, where the extracted classification data comprises an aircraft tail number.

7. The method of claim 1, where the extracted classification data comprises a traffic message.

8. The method of claim 1, where the extracted classification data comprises a message for the aircraft.

9. The method of claim 1, where the extracted classification data comprises a possible message for the aircraft.

10. The method of claim 1, where the extracted classification data comprises an unrecognized message.

11. The method of claim 1, where the logs of the transcriptions are uploaded to cloud based data storage.

12. The method of claim 1, where the logs of the transcriptions are stored in audio log storage.

13. The method of claim 1, where the logs of the transcriptions are stored in data log storage.

14. An apparatus for displaying transcriptions of radio communication transcription for an aircraft, comprising:
    a communications receiver that captures audio signals of radio communication traffic to and from the aircraft;
    a preprocessor that divides the captured audio signals into independent spoken utterances;
    a speech recognition decoder that transcribes each spoken utterance using an air traffic control (ATC) speech recognition model;
    a postprocess that extracts classification data from the transcription of each spoken utterance;

a log manager that logs the transcription of each spoken utterance with reference to the classification data; and a textual display that displays the transcription of each spoken utterance to a crew member of the aircraft, wherein:

the textual display comprises separate sub-displays for: (i) messages for the aircraft, (ii) messages from the aircraft, and (iii) unrecognized messages, and the textual display further comprises a swipe arrow for moving messages from one sub-display another.

* * * * *